June 8, 1954

W. W. FORD 2,680,843

SAFETY SPEED INDICATOR

Filed Jan. 19, 1953

INVENTOR.
William W. Ford
BY
W. W. Williamson
ATTORNEY

June 8, 1954  W. W. FORD  2,680,843
SAFETY SPEED INDICATOR
Filed Jan. 19, 1953  2 Sheets-Sheet 2
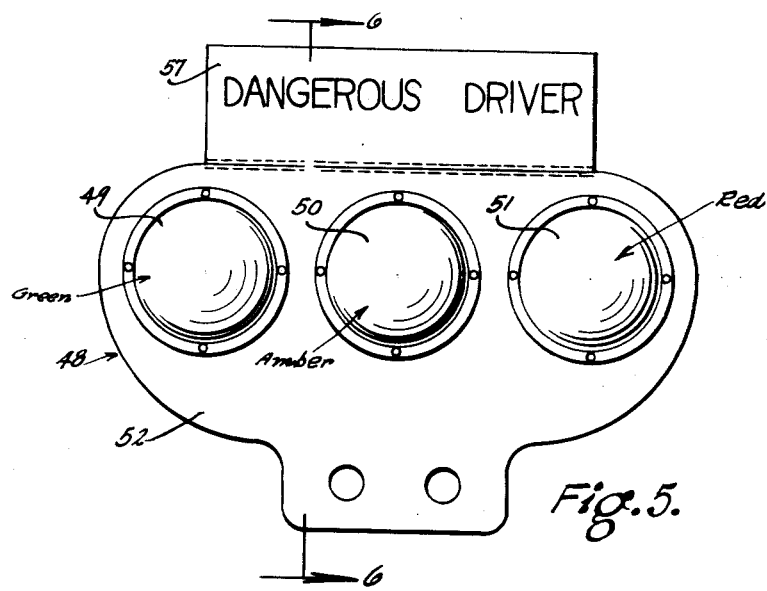
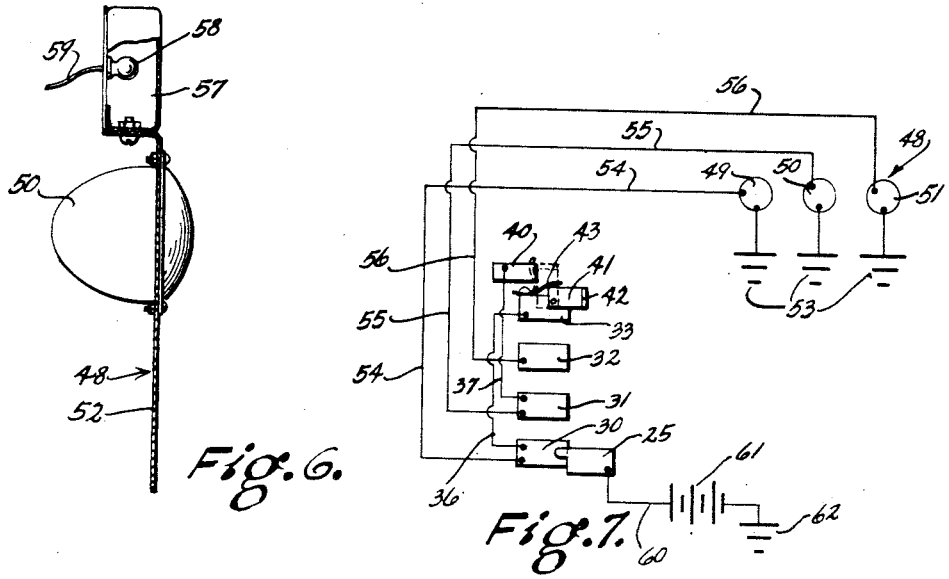
INVENTOR.
William W. Ford
BY
W. W. Williamson
ATTORNEY Patented June 8, 1954

2,680,843

UNITED STATES PATENT OFFICE 2,680,843

SAFETY SPEED INDICATOR

William W. Ford, Philadelphia, Pa.

Application January 19, 1953, Serial No. 331,993

3 Claims. (Cl. 340—264)

My invention relates to a new and useful safety speed indicator for automobiles or other self-propelled vehicles which run upon the highways and has for one of its objects to provide, in combination, indicating devices to show the exact or approximate miles per hour at which the equipped vehicle is travelling up to a reasonable limit, said indicating devices being actuated by a compact and efficient mechanism connected with any appropriate power take-off accurately timed to the speed ratio of the vehicle on which the apparatus is installed.

Another object of this invention is to provide a circuit make and break control for a plurality of indicating units arranged in groups and located at one or more positions on a vehicle, such as the front, rear and interior thereof, said indicating units comprising, for example, a multiplicity of differently colored lamps to be lit individually and in multiples to designate different speeds of vehicle travel.

Another object of the invention is to provide a unique circuit make and break control unit including a disc provided with contactors to carry an electric current from an input contact strip to several output contacts which latter are connected with the indicating units and in which certain of said indicating devices may be actuated individually and in multiples to produce various signals representing preselected speeds of travel of the vehicle.

Another object of this invention is to so construct the circuit make and break control unit, including governor elements, that the operations are accomplished by the weight of the associated parts to eliminate the use of springs.

A further object of the present invention is to provide an indicating means, which may be used singly or in multiple, to indicate to surrounding traffic the approximate speed of a vehicle equipped with the device and to show when the speed is exceeding all reasonable bounds, said indicating means adapted to be electrically connected with an operating means.

With the above and other objects in view this invention consists of the details of construction and combination of elements hereinafter set forth and then designated by the claims.

In order that those skilled in the art to which this invention appertains may understand how to make and use the same I will describe its construction in detail, referring by numerals to the accompanying drawing forming a part hereof, in which:

Fig. 5 is a face view of a signal unit which, for convenience of illustration is shown as including three indicating elements or electric lamps and an attachable sign to be applied to the signal unit when a driver has been convicted as an inveterate speeder.

Fig. 6 is a section on the line 6—6 of Fig. 5 with some parts shown in elevation.

Fig. 7 is a diagrammatic view of the electrical connections.

Figure 1:
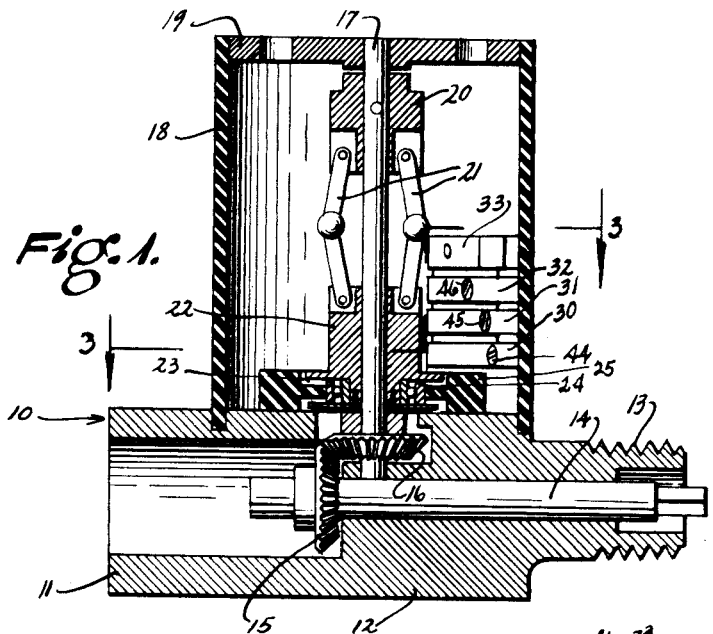
Fig. 1 is a longitudinal vertical sectional view of the operating unit comprising a part of my safety speed indicator.

In carrying out my invention as herein embodied 10 represents the operating unit, Figs 1 to 4, which includes a base 11 consisting of a body 12 terminating at one end in an internally threaded stem 13 for connection to a suitable support on an automotive vehicle. In the base is a horizontal shaft 14 for connection with a driving shaft, such as a flexible shaft connected with the vehicle transmission or other mechanism having a constant ratio relative to the speed of the travelling vehicle.

On the horizontal shaft 14 is fixed a bevel gear 15 meshing with a similar bevel gear 16 fixed to the vertical shaft 17 forming a part of the speed governor included as an element of the controller to be presently described.

A tubular casing 18 of insulating material is mounted on the body portion 12 of the base concentric with the vertical shaft 17 and has a ventilated cover 19 which also acts as a bearing for the top extremity of said shaft 17. To the upper portion of said vertical shaft 17 is fastened the fixed collar 20 to which are pivoted the upper ends of the jointed and weighted governor arms 21 which are also pivotally connected to the neck 22 of the contactor unit, said neck with its component parts being slidable lengthwise of the vertical shaft 17. The contactor neck 22 has an annular groove formation 23 at its lower end to receive the ball bearing 24 and a portion of the contactor ring 25 of insulating material suitably insulated from surrounding metal parts. On the ring 25 are mounted a pair of contact fingers 26 and 27 the latter preferably being spring actuated in a direction to urge it away from the finger 26.

An input contact strip 28 is fixed in a vertical position on the inside surface of the tubular casing or cylinder 18 by suitable fastening devices 29 to one of which is connected a conductor from a source of electricity such as the battery of the vehicle on which the indicator is installed.

Also located on the inside surface of the tubular casing adjacent the input contact strip 28 are a number of vertically spaced direct output contacts 30, 31 and 32 and a supplementary output contacts 33 all of which are insulated from one another with portions in the path of travel of the contactor, particularly the contact finger 26 or some equivalent thereof. For purposes of illustration the output contacts are shown as mounted on a block 34 of insulating material the lower end of which projects below the lowermost output contact 30 to provide a tracking surface 35 for the finger 26 or equivalent contactor element.

Figure 2:
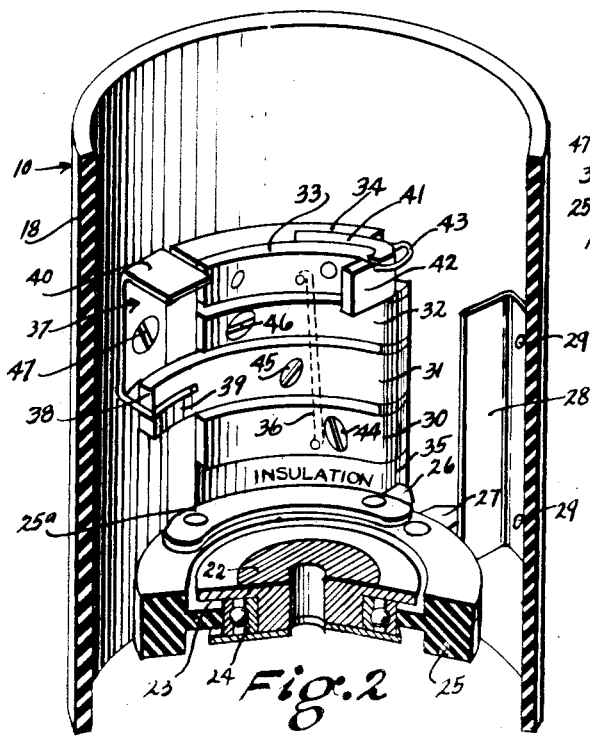
Fig. 2 is an enlarged vertical sectional isometric view of the cylindrical casing carrying the contacts and showing the relation thereto of the travelling contactor having a portion broken away.
Figure 3:
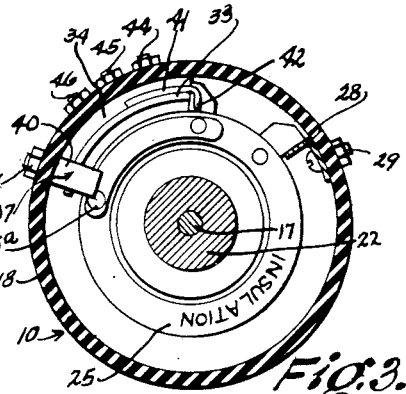
Fig. 3 is a section of the operating unit at the offset line 3—3 of Fig. 1.
Figure 4:
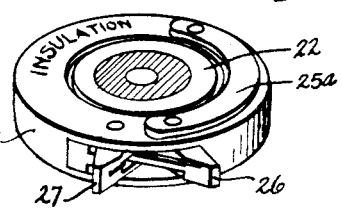
Fig. 4 is an isometric view of the travelling disc contactor with the upper end of its neck cut away.

The bottom output contact 30 is electrically connected with the supplementary output contact 33 by a shunt or jumper 36, Figs. 2 and 7, and electrically connected to the second output contact 31 is a combined secondary conductor and stop 37. As illustrated the combined secondary conductor and stop 37 is a strip of electric conductive metal mounted on the inner surface of the casing with an outturned toe 38 at the bottom end received in a slot 39 at the rear end of said output contact 31 and an outturned stop 40 at the upper end. The toe 38 terminates at approximately the exposed longitudinal surface of the output contact 31 while the stop 40 which is in a plane slightly below the upper edge of the output contact 33 projects into the path of upward travel of the contactor ring which has a conductor strip 25a on the top surface thereof to engage the stop 40 under certain conditions and said conductor strip is electrically connected to the contact fingers 26, 27.

On the forward end of the supplementary output contact 33 in back of the same is pivotally mounted a lever 41 having an outwardly projecting lug 42 in the path of upward travel of a portion of the contactor, particularly the finger 26, and the lug end of said lever is urged downwardly by the spring 43.

Terminal screws 44, 45, 46 and 47 project through the casing 18 and are electrically connected with the direct output contacts 30, 31 and 32, and the combined conductor and stop 37, respectively, whereby the controller unit may be connected by wires or equivalent conductors with the indicating or signal unit to be next described. The terminal screws are spaced vertically and horizontally to permit easy access thereto while installing the apparatus.

An indicator or signal unit 48, usable singly or in multiple, preferably the latter, with one at the front and another at the rear, and possibly one inside of an automobile, comprises a plurality of indicating elements which, for purposes of illustration are shown as three lamps 49, 50 and 51 emitting light rays of different colors, such as green, amber and red, respectively. Other separate colors, combinations of colors or indicia, such as numerals, words or letters may be employed to comply with national or state laws or regulations.

The lamps may be constructed and assembled in any desired manner and, for purposes of illustration only, they are shown as carried by a bracket 52 which is grounded on the vehicle as represented at 53 in Fig. 7. To light the lamps of each signal unit a conductor or wire 54 is connected with the output contact 30 and a lamp 49 (green), another conductor or wire 55 is connected with the output contact 31 and a second lamp 50 (amber) and still another conductor or wire 56 is connected with the output contact 32 and a third lamp 51 (red).

Under some conditions as electrically lighted sign 57 having a visible legend such as "dangerous driver" can be attached to the signal unit and one or more lamps 58 therein connected by a conductor or wire 59 with the terminal screw 47 so the sign will light up when the vehicle is travelling at a prohibitive rate of speed. This sign is adapted to be attached to the signal unit, particularly after a driver has been convicted of habitual speeding by a Court of proper jurisdiction and the parts sealed to prevent tampering or removal. On the other hand the lighting means of the sign can be connected with a constant supply of electricity controlled only by the ignition switch so that the sign becomes visible whenever the vehicle is operated.

The input contact 28 is connected by a conductor 60, Fig. 7, leading to one side of a source of electricity 61, such as a battery on the vehicle, in order to energize the contactor represented by the ring 25 and fingers 26 and 27 and the other side of the battery is grounded as at 62.

In practice, assuming that when the green light 49 is operating it represents a vehicle speed of thirty-five miles per hour, the amber light represents forty-five miles per hour, the red light indicates fifty-five miles per hour, a combination of the green and red lights represents sixty-five miles per hour and the combination of all three lights indicates seventy-five or more miles per hour.

The operating unit 10 is designed to be manufactured with precision accuracy and to be sealed at the factory whereby it will be fool-proof and practically tamper-proof to insure proper and positive operation. The contactor functions with a rubbing action on the various input and output contacts as said contactor raises and descends due to varying speeds of the vehicle translated through the weight of said contactor and the effect of centrifugal force on the governor element thereof. The output contacts are initially accurately spaced for the travel of the contactor in vehicle speed per hour and locations can be varied to accommodate any number of designated miles per hour speed.

As depicted herein, merely for illustrative purposes, none of the lamps will light until the vehicle has reached a speed of thirty-five miles per hour when the contactor 25 will be in engagement with the input contact 28 and the bottom output contact 30 at which time current will flow from the battery to the output contact 30 and then through the conductor or wire 54 to the lamp 49 and to ground back to the battery. As the speed increases the contactor will engage the output contact 31 and light the lamp 50 through the conductor or wire 55. A further increase of speed will cause the contactor to engage the output contact 32 and light the lamp 51 through the conductor or wire 56. The lighting of said lamps singly can represent vehicle speeds of thirty-five, forty-five and fifty-five miles per hour, respectively. Upon a further increase of speed, say to sixty-five miles per hour, the contactor will engage the supplementary contact 33 while still in engagement with the output contact 32, the rise of the contactor being retarded by the spring pressed lever 41 so that both of the lamps 49 and 51 will be lit through current flowing from the output contact 33 through the jumper 36 to the output contact 30 and thence through the conductor or wire 54 to the lamp 49 and simultaneously through the output contact 32 and the wire 56 to the lamp 51. Upon a still further increase in speed, for example to seventy-five or more miles per hour, the spring pressed lever 41 will permit the contactor to be elevated slightly further or until the conductor strip 25a on said contactor engages the stop 40 without the contactor becoming disengaged from either of the output contacts 32 and 33. The electric current will now flow through the output contact 32 and the wire 56 to the lamp 51, also through the supplementary contact 33, jumper 36, output contact 30 and wire 54 to the lamp 49 and likewise through the conductor strip 25a and the secondary conductor and stop 37, output contact 31 and wire 55 to the lamp 50 thus simultaneously lighting the entire bank of lights. Also by connecting a wire to the sign lighting means 58 and the terminal screw 47 of said combined secondary conductor and stop 37 when the excessive speed is attained the extraordinary warning sign 57 will be lighted to warn others to beware.

Under ordinary conditions the signals will indicate to the drivers of other vehicles, both oncoming and following, the speed at which different vehicles are travelling giving the drivers of said other vehicles the opportunity to judge certain situations such as whether or not it is safe to pass one travelling in the same direction before an oncoming one can reach the location where the actual passing will take place. Likewise the signals will indicate to pedestrians when it is safe to cross streets or perform other acts requiring use of the roadway over which vehicles travel.

Of course I do not wish to be limited to the exact details of construction as herein shown and described as these may be varied within the scope of the appended claims without departing from the spirit of my invention.

Having described my invention what I claim as new and useful is:

1. A safety speed indicator comprising an operating unit and a signal unit, said signal unit including three electrically actuated lamps having distinctively different signalling characteristics and connected with one side of an electric circuit of an automotive vehicle, said lamps when lighted singly and in multiples representing preselected different ranges of miles per hour of vehicle travel, said operating unit including a tubular casing, a vertical longitudinal input contact on the inner surface of said casing and electrically connected with the other side of the electric source, three direct output contacts and a supplementary output contact, said output contacts being vertically spaced with the supplementary contact at the top and insulated from each other and the input contact and also laterally spaced from said input contact, each of said direct output contacts electrically connected with a separate one of said lamps, means to electrically connect the first or lowermost direct output contact with the supplementary output contact, a spring pressed lever pivoted to the back of the supplementary output contact at the end opposite to the input contact, a combined secondary conductor and stop mounted on the inside of the casing and electrically connected only to the second higher direct output contact with the stop portion projecting forwardly beyond the curved plane of the exposed faces of the output contacts adjacent the upper edge of the supplementary output contact, a driven shaft in the axial center of the casing, a governor structure on said shaft and responsive to the speed of the latter, a contactor on said governor structure and movable vertically thereby and in constant sliding engagement with the input contact and selectively engageable with all of the output contacts, and then simultaneously with the uppermost direct output contact and the spring pressed lever and then simultaneously with said uppermost direct output contact, said lever and the stop whereby upon acceleration of vehicle speed the lamps will be first successively singly lit then a pair lit and finally all of the lamps will be lit, the reverse operation being accomplished as the vehicle is decelerated.

2. The structure according to claim 1 wherein the contactor comprises a ring of insulating material with ball bearings between said ring and governor structure, electric conductive means projecting from the perimeter of the ring into the space between the input and output contacts for coaction with said contacts, and a conductor strip on the ring to engage the stop and connected to the electric conductive means.

3. The structure of claim 2 wherein the means projecting from the ring perimeter consists of two fingers, one of said fingers being relatively stationary and the other spring pressed away from the stationary one.

References Cited in the file of this patent

UNITED STATES PATENTS

| Number | Name | Date |
|---|---|---|
| 832,600 | Dahl | Oct. 9, 1906 |
| 1,065,672 | Elliott | June 24, 1913 |
| 1,726,835 | Hubbell | Sept. 3, 1929 |
| 2,251,623 | Crofoot et al. | Aug. 5, 1941 |
| 2,543,877 | Stein | Mar. 6, 1951 |
| 2,572,144 | Healy | Oct. 23, 1951 |